W. Beers.
Steering.

N° 23,150.	Patented Mar. 8, 1869.

Witnesses.
Edw. F. Brown
Daniel Breed

Inventor:
William Beers

UNITED STATES PATENT OFFICE.

WILLIAM BEERS, OF MILAN, OHIO.

SHIP-STEERING APPARATUS.

Specification of Letters Patent No. 23,150, dated March 8, 1859.

*To all whom it may concern:*

Be it known that I, WILLIAM BEERS, of Milan, in the county of Erie and State of Ohio, have invented a new and useful Improvement in Machine for Steering Vessels; and I do hereby declare that the following is a full and exact description thereof, reference being had to the accompanying drawings and to the letters of reference marked thereon.

In common machines for steering ships the yoke upon the top of the rudder post often works loose by the changes of weather and the constant and sudden strains of the ship, the waves and the steering wheel. The power from the steering wheel is not usually applied in the most advantageous manner and there is a great loss of power by the improper friction of the machinery.

The object of my invention is to remedy these difficulties and also to prevent the wear and tear of the machine.

My invention consists in a peculiar construction and arrangement of arms upon the rudder post, and also in an arrangement of rollers, collars and guards for preventing friction and concussions.

Figure 1:
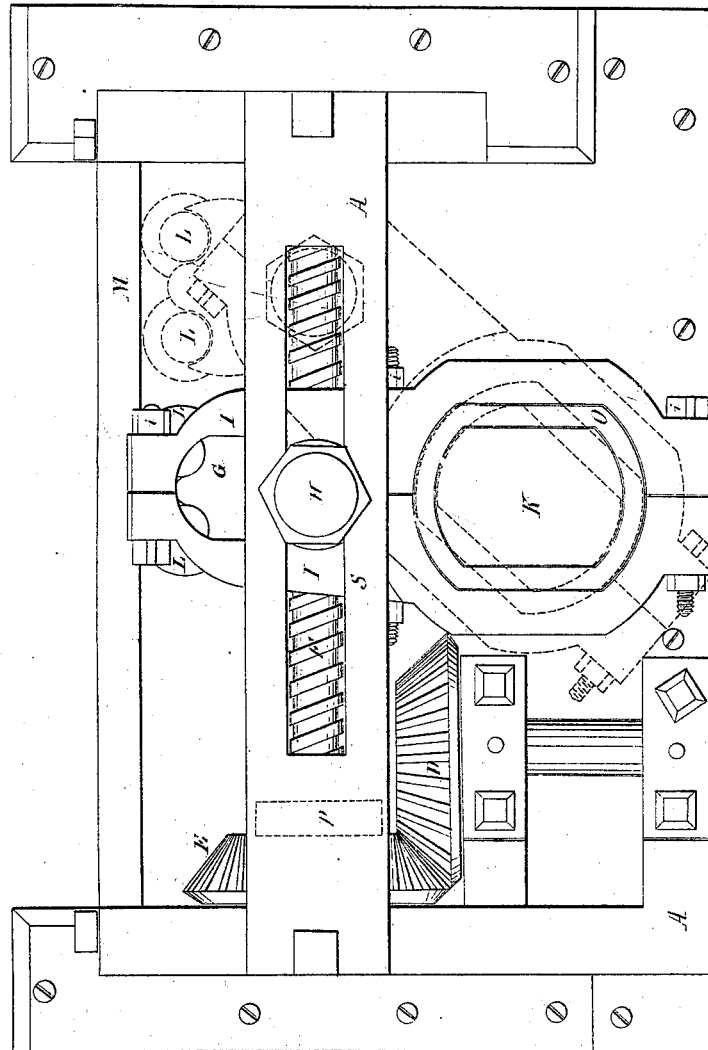
Figure 2:
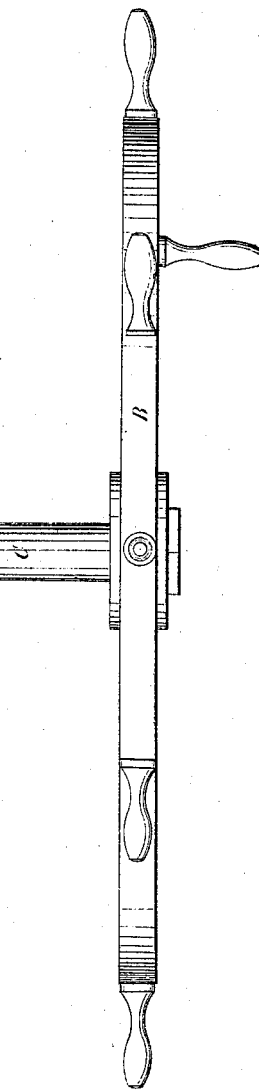
Figure 2:
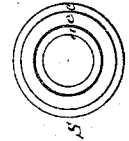

In the accompanying drawings Figure 1, is a top view of my improved machine. Fig. 2, is a top view of my elastic collar detached from the machine.

The frame A of the machine may be of any suitable construction. The steering wheel B Fig. 1, with its shaft C and cog wheel D give motion to the cog wheel E and screw F. This screw gives motion to the nut G, from right to left and from left to right according to the direction in which the steering wheel B is turned. The bolt H is inserted into the top of nut G, so that the motion of the nut carries the slotted arm I, with the nut turning the rudder post K, as seen in red lines Fig. 1. At considerable distance below the screw F, is another arm corresponding to arm I, and directly under the latter. This second arm is attached to the rudder post K, and also bolted to the underside of the nut G. By this arrangement the nut G, has a bearing on both sides of the screw F, therefore the nut is never cramped one side so as to bind against the screw as is common with other machines. Into one side of nut G, are inserted two friction rollers L, which bear against the bar M, thus preventing the nut G, from binding upon the screw F, by lateral pressure in the direction of bar M, when the arm I, is turning from its position in red lines to its position in black lines.

Upon the bolt H, is a friction collar S, fitting the slot in arm I. This collar consists of two metallic rings a, e, Fig. 2, between which, india rubber or other elastic substance c, is inserted. Below the nut G, is another elastic collar Fig. 2, fitting the slot in the lower arm. This construction of collar not only prevents friction but also gives an elastic bearing for the slotted arms thus preventing the wear of the machine from sudden concussions either of waves upon the rudder or the sudden motion of the wheel B.

The slotted arms are made in sections for the purpose of inserting a guard O, of india rubber or other elastic substance around the rudder post K, to prevent the post from becoming loose in the eye of the arm by shrinkage, and to prevent the iron from "chewing" up the rudder post by sudden, violent and frequent strains. This guard O, of india rubber may be an inch or more in thickness before insertion, then the action of the screws i, clamp the sections of the arm down upon the rubber so as to form a very firm joint without injuring the fibers of the wood in the rudder post. Around each end of the screw F, is placed a ring or guard of india rubber seen at P, Fig. 1, in dotted lines. This guard protects the machine from violent concussion when the nut G is driven violently to the end of the screw.

The rudder is directly under the slotted arm I, and moves to the right or left with the arm. The power always acts upon the arm at right angles to the axis of the rudder, which is the most favorable direction to resist the action of the water and move the ship and also the least liable to produce friction by cramping or binding the rudder post.

The screw F, always acts in the direction of its length. Therefore it is much easier to steer a ship by my machine than with other similar machines. Moreover my machine is far more durable than any heretofore constructed because my improvements protect those parts most liable to injury in common machines. My machine is very compact and being mostly behind the rudder post occupies but little room on the vessel.

In the accompanying drawings the wheel B, is so placed in relation to the screw and rudder, as to be turned in the direction you wish to steer the vessel; but the wheel B and gearing may be changed so that the wheel must be turned in the opposite direction.

The particular form and arrangement of my machine may be somewhat varied without departing from the principles of my invention.

Having thus fully described my invention what I claim and desire to secure by Letters Patent of the United States is:

1. The slotted arm or arms, constructed arranged and employed in the manner and for the purposes substantially as set forth.

2. I claim the elastic friction collar or collars S, and the elastic guard or guards P in combination with the above described steering machine for preventing concussion and friction substantially as described.

3. I claim the friction rollers L, in combination with the screw nut G, for preventing the nut from binding upon the screw substantially as set forth.

WILLIAM BEERS.

Witnesses:
EDM. F. BROWN,
DANIEL BREED.